(12) United States Patent
Zhang et al.

(10) Patent No.: US 9,382,965 B2
(45) Date of Patent: Jul. 5, 2016

(54) SELF-ALIGNING ROTARY DAMPER ASSEMBLY

(71) Applicant: ILLINOIS TOOL WORKS INC., Glenview, IL (US)

(72) Inventors: Miao Zhang, Aurora, IL (US); Daniel Calby, Mokena, IL (US)

(73) Assignee: Illinois Tool Works Inc., Glenview, IL (US)

( * ) Notice: Subject to any disclaimer, the term of this patent is extended or adjusted under 35 U.S.C. 154(b) by 113 days.

(21) Appl. No.: 14/355,849

(22) PCT Filed: Nov. 5, 2012

(86) PCT No.: PCT/US2012/063540
§ 371 (c)(1),
(2) Date: May 2, 2014

(87) PCT Pub. No.: WO2013/070543
PCT Pub. Date: May 16, 2013

(65) Prior Publication Data
US 2014/0284155 A1    Sep. 25, 2014

Related U.S. Application Data

(60) Provisional application No. 61/556,360, filed on Nov. 7, 2011.

(51) Int. Cl.
*F16F 9/54* (2006.01)
*F16F 9/12* (2006.01)
*E05F 3/14* (2006.01)

(52) U.S. Cl.
CPC ... *F16F 9/12* (2013.01); *E05F 3/14* (2013.01); *F16F 9/54* (2013.01); *E05Y 2600/11* (2013.01); *E05Y 2600/53* (2013.01)

(58) Field of Classification Search
CPC .............. F16F 9/12; B60R 7/06; F16D 59/00
See application file for complete search history.

(56) References Cited

U.S. PATENT DOCUMENTS

| 4,614,004 | A | 9/1986 | Oshida |
| 5,658,058 | A * | 8/1997 | Bivens ................... B60N 3/102 312/331 |
| 5,829,851 | A | 11/1998 | Bivens et al. |
| 6,910,557 | B2 * | 6/2005 | Doornbos ................. E05F 3/14 188/290 |
| 7,065,829 | B2 | 6/2006 | Okabayashi et al. |

(Continued)

FOREIGN PATENT DOCUMENTS

| EP | 1503111 A2 | 2/2005 |
| WO | 2011100572 A1 | 8/2011 |

OTHER PUBLICATIONS

ISR for PCT/US2012/063540 mailed Mar. 6, 2013.

*Primary Examiner* — Robert A Siconolfi
*Assistant Examiner* — James Hsiao

(57) ABSTRACT

A rotary damper with a toothed wheel gear projecting away from a housing having snap-in connection structures disposed on opposing sides of the wheel gear. The wheel gear may be inserted through a panel opening having a pair of opposing transverse slots. In the assembled condition, the housing with the connected wheel gear may slide linearly in the longitudinal direction of the slots to permit self-adjustment relative to an operatively connected mating gear. Proper meshing relation between the wheel gear and the mating gear is thereby maintained.

20 Claims, 6 Drawing Sheets

(56) References Cited

U.S. PATENT DOCUMENTS

| | | | |
|---|---|---|---|
| 7,350,629 B2* | 4/2008 | Anton | E05F 5/00 188/82.1 |
| 7,823,960 B2* | 11/2010 | Sauer | B60R 7/06 296/187.05 |
| 7,850,219 B2* | 12/2010 | Townson | E05D 11/084 296/50 |
| 7,959,201 B2* | 6/2011 | Staib | B60N 2/4613 296/37.12 |
| 2004/0045398 A1* | 3/2004 | Hayashi | B60R 7/06 74/573.1 |
| 2004/0144604 A1 | 7/2004 | Doornbos et al. | |
| 2005/0023089 A1* | 2/2005 | Okabayashi | B60R 7/06 188/82.2 |
| 2006/0102439 A1 | 5/2006 | Anton et al. | |

* cited by examiner

SELF-ALIGNING ROTARY DAMPER ASSEMBLY

CROSS-REFERENCE TO RELATED APPLICATIONS

This non-provisional application claims the benefit of, and priority from, U.S. provisional application 61/556,360 filed Nov. 7, 2011. The contents of such prior provisional application are hereby incorporated by reference in their entirety as if fully set forth herein.

TECHNICAL FIELD

The present disclosure relates generally to rotary dampers, and more specifically to a rotary damper assembly adapted for self alignment relative to a meshing gear.

BACKGROUND

It is generally known in the art that a rotary oil-type damper device can be incorporated as a mechanism for controlling the opening and closing of doors and drawers such as automotive storage bins, cup holders and the like. By way of example, dampers are disclosed in U.S. Pat. Nos. 5,829,851 and 5,658,058, the teachings of which incorporated herein by reference in their entirety.

Rotary damper devices typically include a stator housing and a rotor having a toothed wheel gear. The toothed wheel gear is generally adapted for mesh engagement with a mating gear fixed to a portion of the object being opened. It is generally desirable to maintain an aligned meshed relation with proper spacing between the mating gear and the gear of the damper device. In the event of separation because the engagement is too loose, a ratcheting or gear skipping problem may occur thereby preventing a smooth opening. If the engagement is too tight, damage may occur to the meshing teeth. In order to compensate for changes which may take place during operation, it is desirable for the damper device to adjust position during use to maintain the desired aligned meshing relation without being either too loose or too tight. Accordingly, a construction that facilitates self-adjustment without substantial complexity may be desirable.

BRIEF SUMMARY

The present disclosure provides advantages and alternatives over the prior art by providing a rotary damper with a toothed wheel gear projecting away from a housing having snap-in connection structures disposed on opposing sides of the wheel gear. The wheel gear may be inserted through a panel opening having a pair of opposing transverse slots. In the assembled condition, the housing with the connected wheel gear may slide linearly along a travel path defined by the slots to permit self-adjustment relative to a mating gear.

In accordance with one exemplary construction, the present disclosure provides a rotary damper adapted to engage a mating gear to dampen the rate of relative movement between a support panel supporting the rotary damper and an opposing structure supporting the mating gear. The rotary damper includes a rotatable wheel gear projecting away from a housing containing a damping fluid with a pair of upwardly projecting snap-in connection structures disposed on opposing sides of the wheel gear. The snap-in connection structures include legs projecting away from the housing in the same direction as the wheel gear. The wheel gear is sized for insertion through a through hole in the support panel. The legs are adapted for insertion in snap-in relation through slots in the support panel substantially aligned with one another on opposing sides of the through hole, such that portions of the legs are supported in sliding relation on a surface of the support panel at positions outboard from the slots. Following insertion of the legs, the housing is slideable relative to the support panel along a substantially linear travel path defined by the slots. The wheel gear is spaced apart from at least one of the snap-in connection structures at a predefined distance selected to retain the mating gear in operative connection to the wheel gear during sliding movement of the housing.

Other features and advantages will become apparent to those of skill in the art upon review of the following non-limiting detailed description, claims and drawings.

Figure 1:
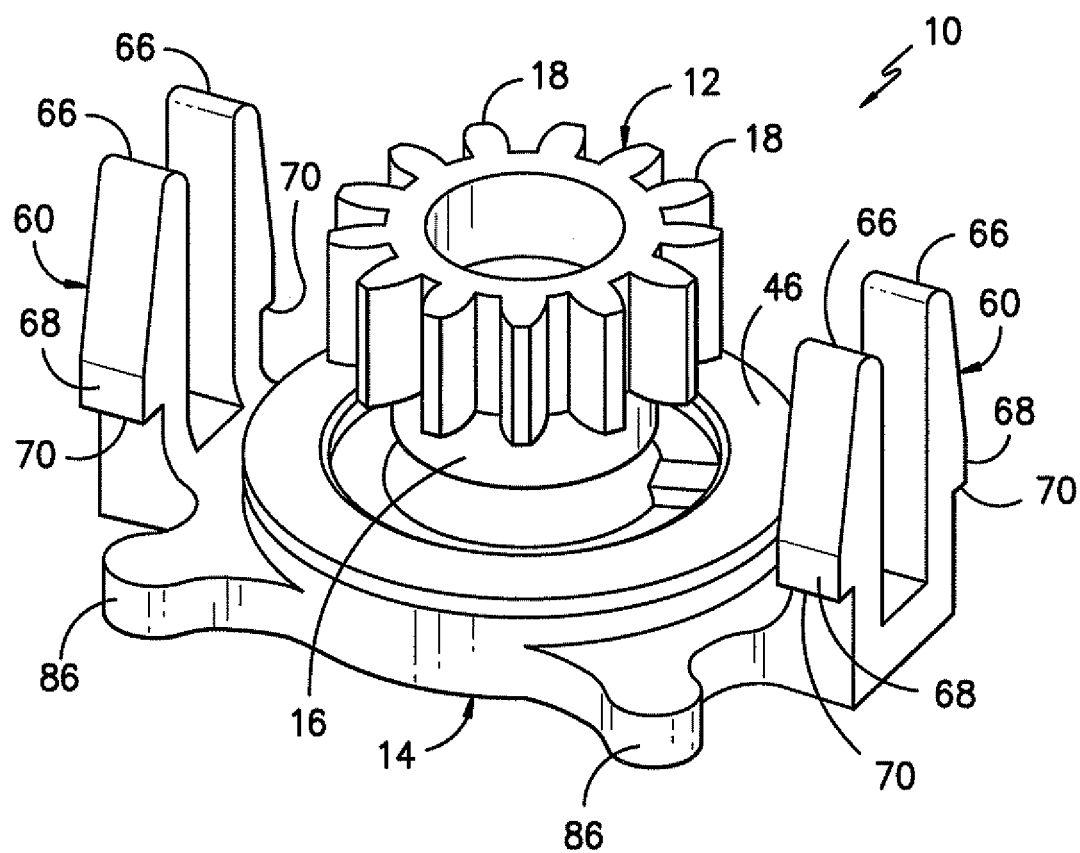
FIG. 1 is an assembly view of an exemplary rotary damper in accordance with the present disclosure.

Before the exemplary embodiments of the invention are explained in detail, it is to be understood that the invention is in no way limited in its application or construction to the details and the arrangements of the components set forth in the following description or illustrated in the drawings. Rather, the invention is capable of other embodiments and being practiced or being carried out in various ways.

DETAILED DESCRIPTION OF THE PREFERRED EMBODIMENTS

Reference will now be made to the various drawings, wherein to the extent possible, like reference numerals are used to designate like elements in the various views. Referring now to the figures, FIG. 1 illustrates an exemplary rotary damper assembly 10 in accordance with the present disclosure. As shown, in the illustrated exemplary construction, the rotary damper assembly 10 includes a toothed wheel gear 12 of generally annular construction projecting away from a housing 14 containing damping oil or other liquid adapted to dampen rotation of the wheel gear in a manner as will be described more fully hereinafter.

Figure 2:
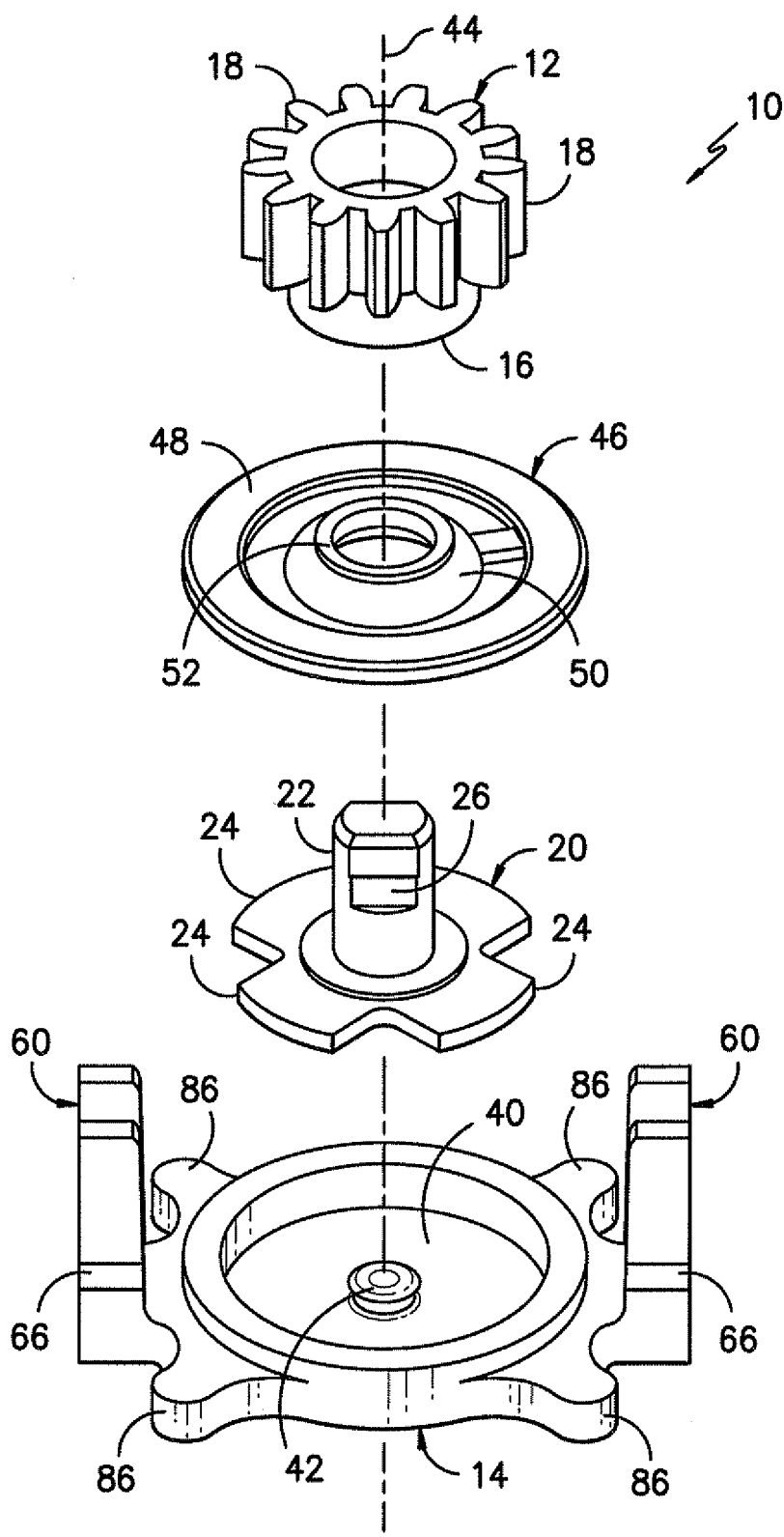
FIG. 2 is an exploded view of the rotary damper of FIG. 1.

As best seen through joint reference to FIGS. 1 and 2, in the exemplary rotary damper assembly 10, the wheel gear 12 includes a hollow axial hub 16 with a multiplicity of radially projecting teeth 18 disposed circumferentially around an upper portion of the axial hub 16. A lower portion of the hub 16 extends downwardly below the teeth 18.

In the illustrated exemplary construction, the wheel gear 12 is operatively connected to a rotor 20 of unitary construction having an axial rotor shaft 22 projecting upwardly from a plurality of radially projecting vanes 24 such that rotation of the rotor shaft causes a corresponding angular rotation of the vanes 24. As shown, in the exemplary construction, the vanes 24 are substantially flat and coplanar with one another arranged in a generally cross-shaped pattern with four outwardly projecting vanes extending about the base of the rotor shaft 22. However, any number of other vane patterns may be used incorporating a greater or lesser number of vanes and/or different vane angles as may be desired.

As shown, the rotor shaft 22 is adapted to fit in locked relation at the interior of the axial hub 16 of the wheel gear 12. By way of example only, and not limitation, the rotor shaft 22 may include opposing surface flats 26 (only one shown) adapted to align with complementary flat surfaces at the interior of the axial hub 16 when the rotor shaft 22 is inserted into the axial hub 16 such that insertion requires a predefined orientation between the rotor shaft and the axial hub 16. That is, the rotor shaft 22 is inserted in a key-wise manner into the axial hub 16. Thus, once insertion has taken place, any axial rotation of the wheel gear 12 is translated to the rotor shaft 22 and vanes 24. If desired, the rotor shaft 22 may be hollow along at least a portion of its length and may include an axial opening (not shown) at the proximal end slightly below the underside of the vanes 24.

In the illustrated exemplary construction, the housing 14 is a unitary molded construction of plastic or similar material formed by techniques such as injection molding or the like. As shown, the housing 14 includes a concave well cavity 40 adapted to contain silicone damping oil or other liquid. The depth of the well cavity 40 may be sufficient to fully receive the vanes 24 such that the damping oil or other liquid substantially covers the vanes in the assembled condition. The inner diameter of the well cavity 40 is preferably slightly greater than the effective diameter of the rotor defined by the vanes 24 such that the walls of the cavity do not obstruct rotation of the rotor. If desired, a raised detent 42 may be disposed at the base of the well cavity 40 in substantial alignment with the rotor shaft 22 such that the detent 42 may be received in supporting relation within the axial opening at the proximal end of the rotor shaft 22 below the vanes 24. Thus, the raised detent 42, rotor 20 and wheel gear may all be disposed substantially in line along a common axis 44.

In the illustrated exemplary construction, a cap 46 (FIG. 2) of generally annular construction is disposed circumferentially about the rotor shaft 22 at a position above the vanes 24. The cap 46 is has an outer diameter substantially corresponding to the inner diameter of the well cavity 40 and may be welded or otherwise secured in place at the interior of a well cavity 42. In the illustrated exemplary construction, the cap 46 includes an outer annular ring 48 and a central annular dome 50 disposed radially inward from the outer annular ring 48. As shown, the central annular dome 50 has an axial opening adapted for disposition in surrounding relation to the axis 44 for receipt of the axial rotor shaft 22 during assembly. In the illustrated exemplary construction, the central annular dome 50 includes a raised lip 52 disposed circumferentially about the axial opening. The raised lip 52 may have a relatively short cylindrical configuration with an inner diameter substantially corresponding to the diameter of the rotor shaft 22 below the flats 26 so as to form a substantially fluid tight seal. The outer diameter of the raised lip 52 may correspond substantially to the inner diameter of the axial hub 16 such that during assembly, the raised lip 52 may be inserted into the interior of the axial hub 16 with the bottom of the axial hub pressing down on the central annular dome. The cap 46 may be affixed in place to the housing 14 by use of joining techniques such as welding, adhesive bonding or the like as will be well known to those of skill in the art.

As noted previously, the well cavity 40 is at least partially filled with a liquid such as silicone oil or the like engaging the vanes 24 of the rotor 20 during rotation. The oil or other liquid is prevented from leaking out of the well cavity 40 by the cap 46 which forms a seal relative to both the rotor shaft 22 and the housing 14. The presence of the oil in the well cavity 40 provides smooth resistance to rotation of the rotor 20 and the operatively connected wheel gear 12. Of course, resistance systems other than liquid engaging rotating vanes likewise may be used if desired.

Regardless of the resistance system utilized, the housing 14 is adapted to be secured to a mounting panel or other support structure such that the assembled rotary damper assembly 10 may slide short distances in a linear manner back and forth across the surface of a support structure to provide self-adjustment between the wheel gear 12 and a cooperating meshing gear during use. The housing 14 is also adapted to prevent separation between the wheel gear 12 and a cooperating mating gear 62. Thus a proper meshing relation may be maintained continuously during operation.

Figure 5:
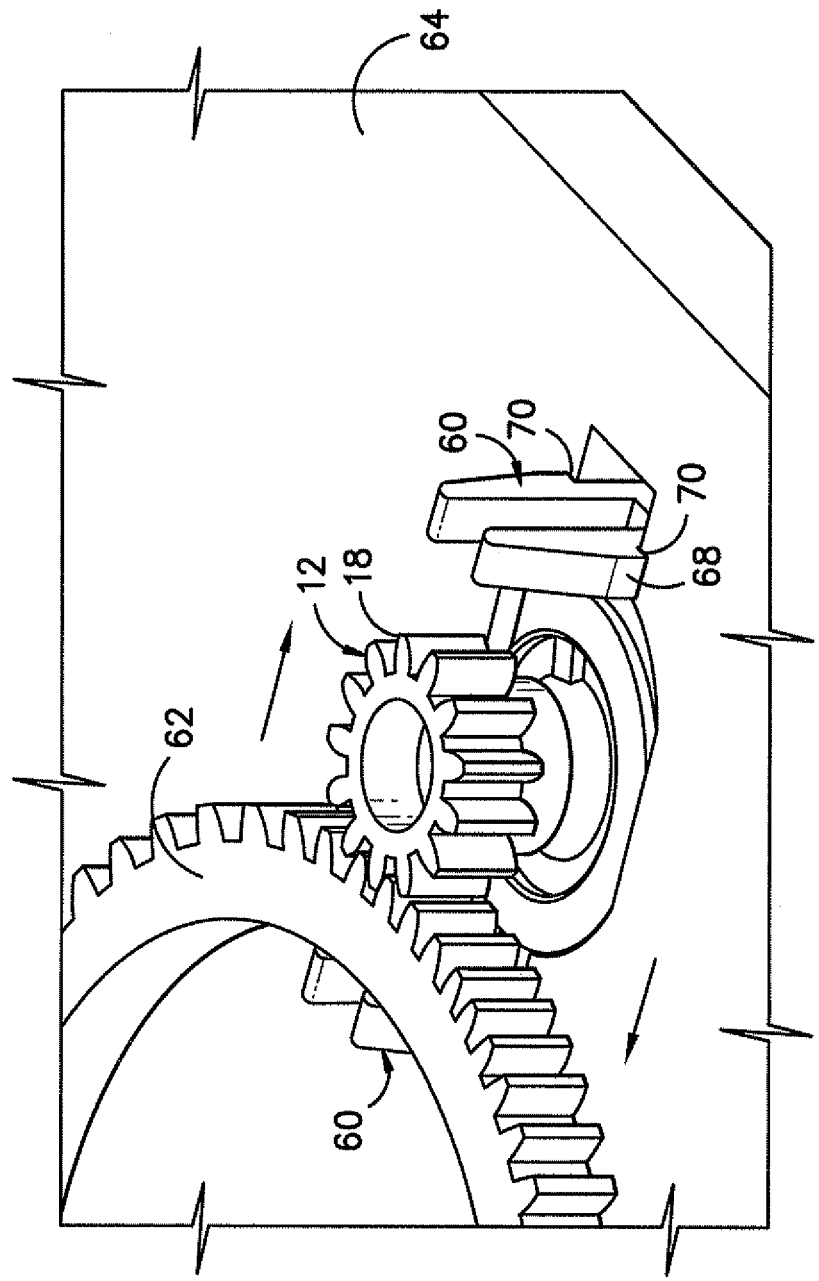
FIG. 5 is a view illustrating a meshing arrangement with a mating gear between a snap-in connection and the damper wheel gear.

In the illustrated exemplary construction, the housing 14 includes a pair of upwardly projecting integral double leg snap-in connection structures 60 projecting away from opposing sides of the well cavity 40. Thus, in final assembly, the wheel gear 12 is disposed between the snap-in connection structures 60 (FIG. 1). As shown, the snap-in connection structures 60 may be spaced at approximately 180 degrees from one another and are in radially spaced relation from the wheel gear 12 at a distance adequate to receive a mating gear 62 (FIG. 5). In this regard, while the mating gear 62 is shown as a ring gear, other constructions such as linear gears and the like also may be used.

By way of example only, and not limitation, the mating gear 62 may be affixed to the side of a rotatable storage bin such as a glove box, sunglass bin or the like near the pivot point for the bin and the rotary damper assembly 10 may be secured in a support panel 64 disposed in opposing relation to the side of the bin. Thus, as the bin is rotated, the mating gear 62 will likewise rotate and translate rotational movement to the wheel gear 12. Of course, the relative positions of the damper assembly 10 and mating gear 62 may be reversed if desired. The spacing between the snap-in connection structures 60 and the wheel gear 12 is preferably set such that the mating gear 62 is held in proper spaced relation relative to the wheel gear 12. For any given system, this distance may be selected based on factors such as the length of the teeth 18 and the thickness of the mating gear 62.

Figure 6:
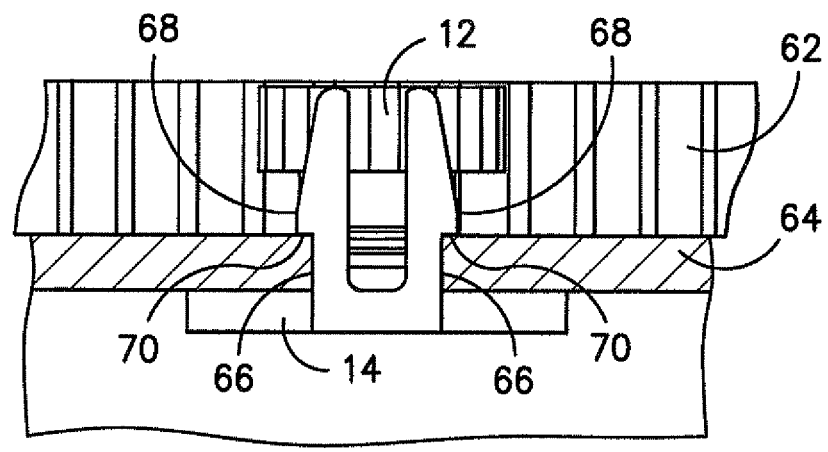
FIG. 6 is a cut-away view illustrating the legs of a snap-in connection in locked relation over a surface of a support panel.

Referring to FIG. 5, as the mating gear 62 rotates with a bin or other structure on which it is mounted, the rotary damper assembly may be urged to undergo some linear movement relative to the stationary support panel 64. While this relative linear movement may be slight, in the absence of adjustment, the proper meshing arrangement between the wheel gear 12 and the mating gear 62 may be compromised. In the illustrated exemplary construction the position of the damper assembly 10 may be self-adjusting to accommodate such relative linear movement during use. In this regard, the snap-in connection structures 60 may each include a pair of flexible spaced-apart legs 66. As best seen in FIG. 6, in the illustrated exemplary construction the legs 66 each may have a half arrowhead profile with ramped outer surfaces 68 facing in opposite directions. The ramped outer surfaces 68 define nose projections extending outwardly away from one another with shoulders 70 disposed below the nose projections.

Figure 3:
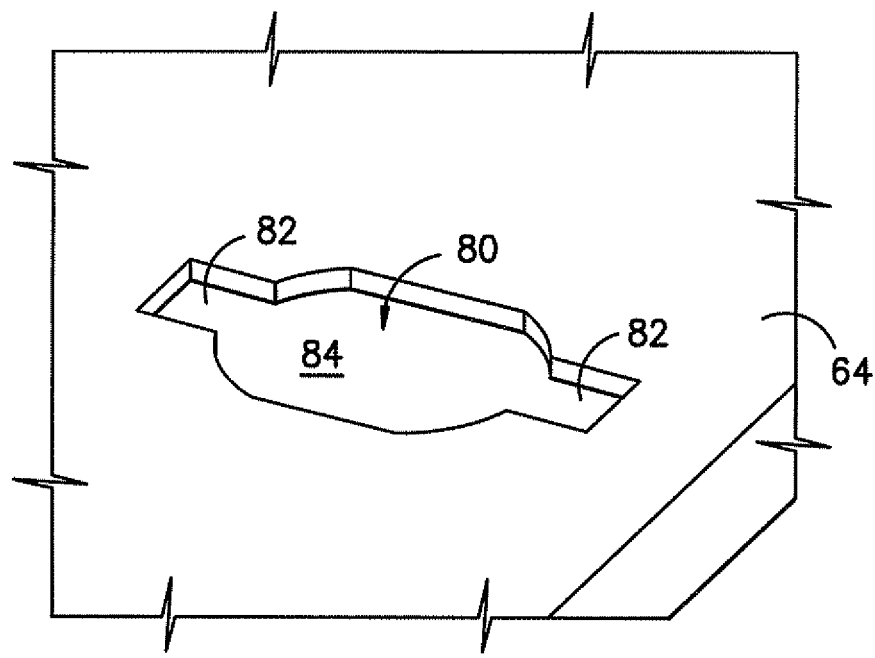
FIGS. 3 and 4 are a set of views illustrating a panel before and after mounting of the rotary damper respectively.
Figure 4:
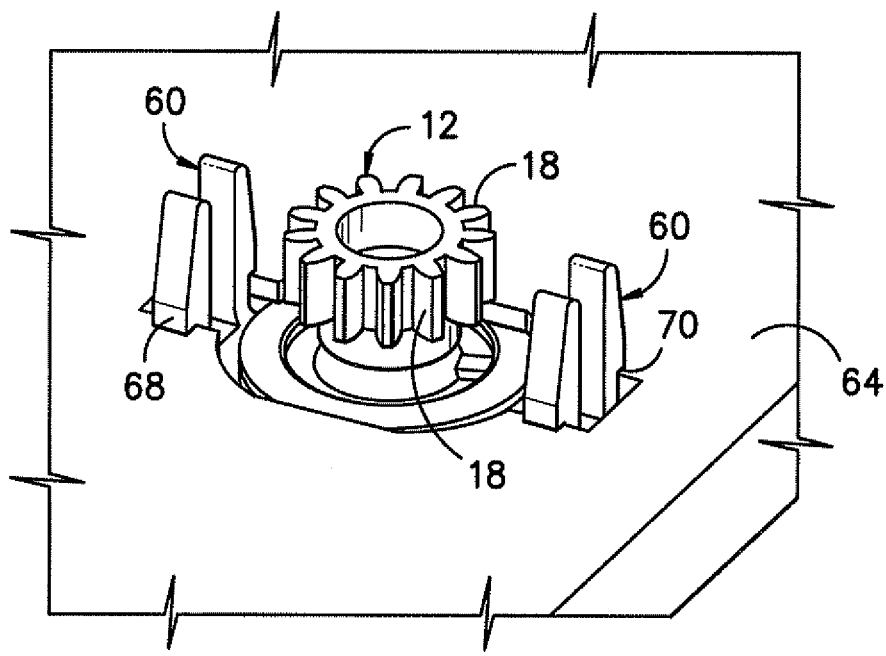

As best seen through joint reference to FIGS. 1, 3 and 4, the fully assembled damper assembly 10 may be inserted through a panel opening 80 having a pair of opposing slots 82 aligned with one another on opposing sides of an enlarged through-hole 84 such that the wheel gear 12 projects through the enlarged through-hole 84 and the distal ends of the snap-in connection structures 60 each project through a corresponding one of the opposing slots 82. Although the slots 82 are illustrated as physically intersecting the enlarged through-hole 84, it is also contemplated that one or both of the slots 82 may be spaced apart from the enlarged through-hole 84 if desired.

As will be appreciated, during insertion, the legs 66 flex inwardly towards one another as the snap-in connection structures 60 are pressed into the slots 82 and then spring outwardly such that the ramped outer surfaces 68 snap behind the surface of the support panel 64 with the shoulders 70 extending away from the slots 82 in transverse relation to the length dimension of the slots. In this assembled condition, the shoulders 70 rest on the upper surface of the support panel 64 and act to block withdrawal of the housing from the panel. As shown, the distance between the ends of the slots 82 is slightly greater than the distance between the outboard surfaces of the snap-in connection structures 60. Thus, the housing 14 is able to slide linearly to a limited degree along the slots 82.

As best seen through joint reference to FIGS. 2 and 7, the housing 14 may include an arrangement of radially projecting paws 86 extending outwardly for disposition below the support panel 64 to promote underlying blocking support outboard of the through hole 34 as the rotary damper assembly slides in a reciprocating manner. In the exemplary construction, the paws 86 are at an elevation below the shoulders 70 with the elevation difference between the paws 86 and the shoulders 70 being equal to or greater than the thickness of the support panel 64. In the final assembled condition, the paws 86 are disposed below the support panel 64 following insertion of the legs 60 through the slots 82. Thus, the housing 14 cannot be pushed through the panel opening 80 regardless of the sliding position.

Figure 7:
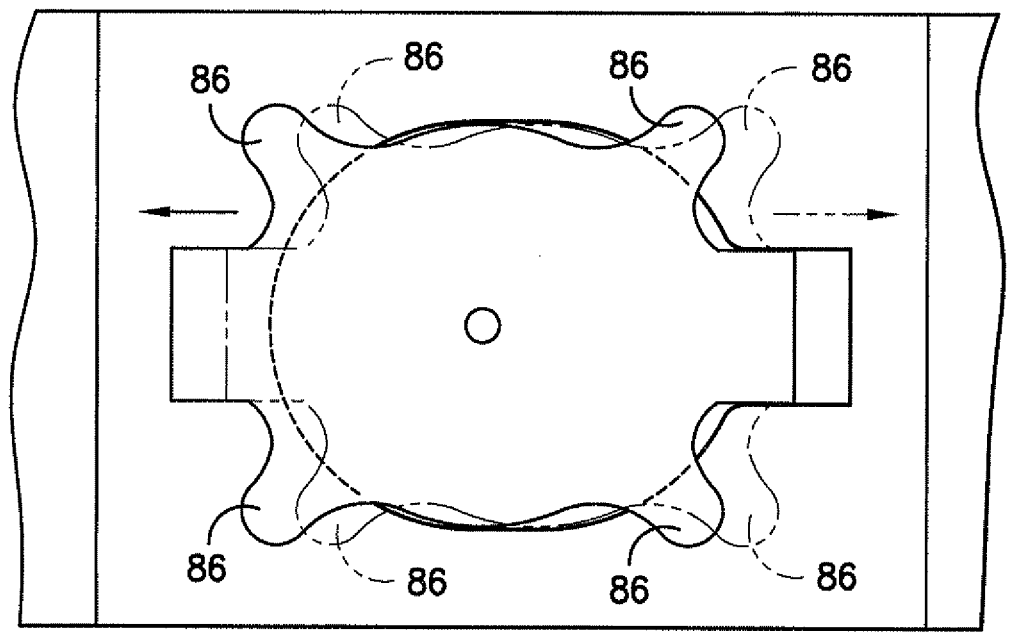
FIG. 7 is a view illustrating a pattern of paws arranged at the base of the housing for disposition across the underside of the support panel.

As best seen through reference to FIGS. 5 and 7, once installation is complete, the aligned slots 82 define a travel path for sliding movement and the rotary damper assembly may self-adjust by moving linearly in response to applied forces between the wheel gear 12 and the mating gear 62. Thus, a meshing relation which is neither too tight nor too loose may be maintained.

Figure 8:
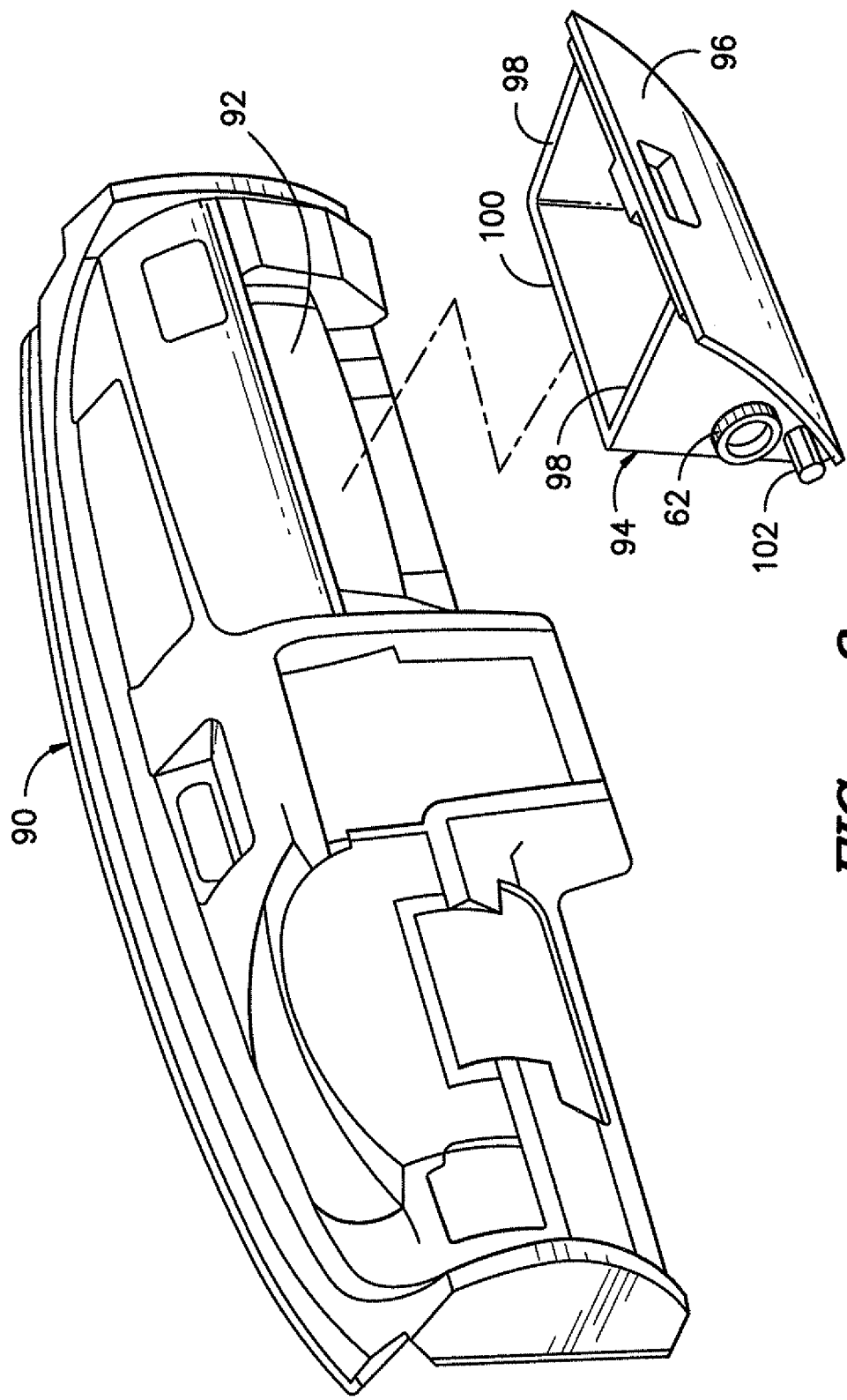
FIG. 8 is a view illustrating an exemplary storage bin which may operatively engage a rotary damper to dampen the rotational movement of the bin.

As noted previously, in one exemplary environment of use, the rotary damper assembly 10 (FIG. 1) may be mounted in a structural sidewall of an opening containing a rotating bin. By way of example only, and not limitation, FIG. 8 illustrates an exemplary instrument panel 90 as may be used in an automotive vehicle positioned at the front end of a passenger compartment in an automobile. As shown, the instrument panel 90 includes an opening 92 adapted to receive and contain a glove box 94. In the illustrated exemplary arrangement, the glove box 94 includes a front panel 96 which is adapted to be in substantially flush relation with the surrounding surface of the instrument panel 10 when the glove box is in a closed position. The glove box 94 further includes a pair of laterally spaced side panels 98 and a rear panel 100 joined to the rear edges of the side panels 98 to define a bin interior adapted to hold various articles. As illustrated, pivot shafts 102 (only one shown) project outwardly away from the side panels 98 to define an axis of rotation for the glove box 94 as it is rotated between open and closed positions.

In accordance with the present disclosure, a mating gear 62 (only one shown) such as a ring gear or the like as illustrated and described in relation to FIG. 5 may be fixed to the exterior of each side panel 98. In this arrangement, the mating gears 62 may engage the wheel gears of rotor damper assemblies (not shown) mounted as previously described and projecting through panel openings in the sidewalls of the opening 92 to establish an operative condition as illustrated in FIG. 5. That is, the mating gear 62 will be captured in the space between the wheel gear 12 and a snap-in connection structure 60.

As will be appreciated, when the glove box 94 is rotated between open and closed positions, the mating gear 62 will likewise rotate and thereby cause rotation of the wheel gear 12 and associated rotor 20. The rotation of the glove box will thereby be dampened by the resistance provided between the vanes 24 and damping oil or other liquid in the well cavity. A more controlled opening and closing is thereby provided.

During rotation of the glove box or other structure, the proper engagement between the wheel gear 12 and the mating gear 62 may be maintained continuously. In this regard, if the rotation of the bin causes the mating gear 62 to push against the wheel gear 12, the rotary damper assembly may slide in response to that pushing force to maintain the desired spacing relative to the mating gear. Conversely, if the rotation of the bin causes the mating gear 62 to pull away from the wheel gear 12, the mating gear 62 will apply a biasing force against the snap-in connection structure 60, thereby causing the rotary damper assembly to move in response. Thus, a continuous spacing is maintained which is neither too tight nor too loose. Moreover, as previously described, the paws 86 act to prevent the rotary damper assembly from becoming disengaged from its underlying support panel.

Of course, variations and modifications of the foregoing are within the scope of the present invention. Thus, it is to be understood that the invention disclosed and defined herein extends to all alternative combinations of two or more of the individual features mentioned or evident from the text and/or drawings. All of these different combinations constitute various alternative aspects of the present invention.

What is claimed is:

1. A rotary damper adapted to engage a mating gear to dampen the rate of relative movement between a support panel supporting the rotary damper and an opposing structure supporting the mating gear, the rotary damper comprising: a rotatable wheel gear projecting away from a housing containing a damping fluid, the housing including a pair of upwardly projecting snap-in connection structures disposed on opposing sides of the wheel gear; the snap-in connection structures comprising pairs of opposing legs projecting away from the housing in the same direction as the wheel gear; the wheel gear being sized for insertion through a through hole in the support panel and the legs being adapted for insertion in snap-in relation through slots within the support panel substantially aligned with one another on opposing sides of the through hole, and wherein said slots are characterized by a width dimension which is smaller than the through hole, wherein the opposing legs in each snap-in connection structure are spaced at a distance which is smaller than the through hole such that the opposing legs are adapted for insertion in snap-in relation through slots having a width less than the through hole such that portions of the legs are supported in sliding relation on a surface of the support panel at positions outboard from the slots with all portions of the snap-in connection structures maintained outboard from the through hole and the housing is slidable relative to the support panel along a substantially linear travel path defined by the slots; the wheel gear being spaced apart from at least one of the snap-in connection structures at a predefined distance selected to retain the mating gear in operative connection to the wheel gear during reciprocating sliding movement of the housing.

2. The rotary damper as recited in claim 1, wherein the mating gear is supported at a surface of a rotatable storage bin, and the support panel supporting the rotary damper is a containment wall of a bin opening housing the storage bin.

3. The rotary damper as recited in claim 1, wherein the housing includes a fluid well holding the damping fluid, and the upwardly projecting snap-in connection structures are disposed on opposing sides of the fluid well.

4. The rotary damper as recited in claim 3, wherein at least one of the snap-in connection structures comprises a pair of resilient, spaced-apart legs, the legs having ramped outer surfaces defining nose projections extending outwardly away from one another with shoulders disposed below the nose projections, the ramped outer surfaces being adapted to snap behind the surface of the support panel following insertion of the leas through the slots with the shoulders extending away from the slots in transverse relation to the length dimension of the slots.

5. The rotary damper as recited in claim 4, wherein the housing further includes a plurality of radially extending paws at an elevation below the shoulders, the elevation difference between the paws and the shoulders being equal to or greater than the thickness of the support panel, such that the paws are disposed below the support panel following insertion of the legs through the slots.

6. The rotary damper as recited in claim u, wherein each of the snap-in connection structures comprises a pair of resilient, spaced-apart legs, the legs having ramped outer surfaces defining nose projections extending outwardly away from one another with shoulders disposed below the nose projections, the ramped outer surfaces being adapted to snap behind the surface of the support panel following insertion of the legs through the slots with the shoulders extending away from the slots in transverse relation to the length dimension of the slots.

7. The rotary damper as recited in claim 6, wherein the housing further includes a plurality of radially extending paws at an elevation below the shoulders, the elevation difference between the paws and the shoulders being equal to or greater than the thickness of the support panel, such that the paws are disposed below the support panel following insertion of the legs through the slots.

8. The rotary damper as recited in claim 6, wherein the housing is a unitary molded construction.

9. The rotary damper as recited in claim 1, wherein the mating gear is a ring gear.

10. The rotary damper as recited in claim 9, wherein the wheel gear comprises a plurality of teeth extending away from a hollow hub, and wherein a rotor is held in keyed relation at the interior of the hub, the rotor including a plurality of vane elements adapted to rotate within a fluid well holding the damping fluid when the wheel gear rotates.

11. A rotary damper adapted to engage a mating gear to dampen the rate of relative movement between a support panel supporting the rotary damper and an opposing structure supporting the mating gear, the rotary damper comprising: a rotatable wheel gear projecting away from a housing containing a damping fluid; a rotor operatively connected to the wheel gear, the rotor comprising a rotor shaft and a plurality of vane elements extending radially away from the rotor shaft, wherein the rotor shaft is disposed in substantially fixed, coaxial relation to the wheel gear such that rotation of the wheel gear is translated through the rotor shaft to the vane elements; the housing including a fluid well holding the damping fluid, the vane elements being disposed in contacting relation to the damping fluid within the fluid well; the housing further including a pair of upwardly projecting snap-in connection structures disposed on opposing sides of the wheel gear, the snap-in connection structures comprising pairs of opposing legs projecting away from the housing in the same direction as the wheel gear; the wheel gear being sized for insertion through a through hole in the support panel and the legs being adapted for insertion in snap-in relation through slots within the support panel substantially aligned with one another on opposing sides of the through hole, and wherein said slots are characterized by a width dimension which is smaller than the through hole, wherein the opposing legs in each snap-in connection structure are spaced at a distance which is smaller than the through hole such that the opposing legs are adapted for insertion in snap-in relation through slots having a width less than the through hole such that portions of the legs are supported in sliding relation on a surface of the support panel at positions outboard from the slots with all portions of the snap-in connection structures maintained outboard from the through hole and the housing is slidable relative to the support panel along a substantially linear travel path defined by the slots; the wheel gear being spaced apart from at least one of the snap-in connection structures at a predefined distance selected to retain the mating gear in operative connection to the wheel gear during reciprocating sliding movement of the housing.

12. The rotary damper as recited in claim 11, wherein the mating gear is supported at a surface of a rotatable storage bin, and the support panel supporting the rotary damper is a containment wall of a bin opening housing the storage bin.

13. The rotary damper as recited in claim 11, wherein the upwardly projecting snap-in connection structures are disposed on opposing sides of the fluid well.

14. The rotary damper as recited in claim 13, wherein at least one of the snap-in connection structures comprises a pair of resilient, spaced-apart legs, the legs having ramped outer surfaces defining nose projections extending outwardly away from one another with shoulders disposed below the nose projections, the ramped outer surfaces being adapted to snap behind the surface of the support panel following insertion of the legs through the slots with the shoulders extending away from the slots in transverse relation to the length dimension of the slots.

15. The rotary damper as recited in claim 14, wherein the housing further includes a plurality of radially extending paws at an elevation below the shoulders, the elevation difference between the paws and the shoulders being equal to or greater than the thickness of the support panel, such that the paws are disposed below the support panel following insertion of the legs through the slots.

16. The rotary damper as recited in claim 13, wherein each of the snap-in connection structures comprises a pair of resilient, spaced-apart legs, the legs having ramped outer surfaces defining nose projections extending outwardly away from one another with shoulders disposed below the nose projections, the ramped outer surfaces being adapted to snap behind the surface of the support panel following insertion of the legs through the slots with the shoulders extending away from the slots in transverse relation to the length dimension of the slots.

17. The rotary damper as recited in claim 16, wherein the housing further includes a plurality of radially extending paws at an elevation below the shoulders, the elevation difference between the paws and the shoulders being equal to or greater than the thickness of the support panel, such that the paws are disposed below the support panel following insertion of the legs through the slots.

18. The rotary damper as recited in claim 16, wherein the housing is a unitary molded construction.

19. The rotary damper as recited in claim 11, wherein the mating gear is a ring gear.

20. A rotatable bin assembly including a rotatable storage bin and a rotary damper adapted to engage a mating gear to dampen the rate of relative movement between a support panel supporting the rotary damper and the rotatable storage bin, the bin assembly comprising: a rotary damper comprising a rotatable wheel gear projecting away from a housing containing a damping fluid, the housing including a pair of upwardly projecting snap-in connection structures disposed on opposing sides of the wheel gear; the snap-in connection structures comprising pairs of opposing legs projecting away from the housing in the same direction as the wheel gear; the wheel gear being sized for insertion through a through hole in the support panel and the legs being adapted for insertion in snap-in relation through slots within the support panel substantially aligned with one another on opposing sides of the through hole, and wherein said slots are characterized by a width dimension which is smaller than the through hole, wherein the opposing legs in each snap-in connection structure are spaced at a distance which is smaller than the through hole such that the opposing legs are adapted for insertion in snap-in relation through slots having a width less than the through hole such that portions of the legs are supported in sliding relation on a surface of the support panel at positions outboard from the slots with all portions of the snap-in connection structures maintained outboard from the through hole and the housing is slidable relative to the support panel along a substantially linear travel path defined by the slots; the wheel gear being spaced apart from at least one of the snap-in connection structures at a predefined distance selected to retain the mating gear in operative connection to the wheel gear during reciprocating sliding movement of the housing; and a rotatable storage bin having the mating gear mounted thereon.

* * * * *